April 29, 1930.  S. THURSTENSEN  1,756,225
UNION CHECK VALVE
Filed Jan. 2, 1926
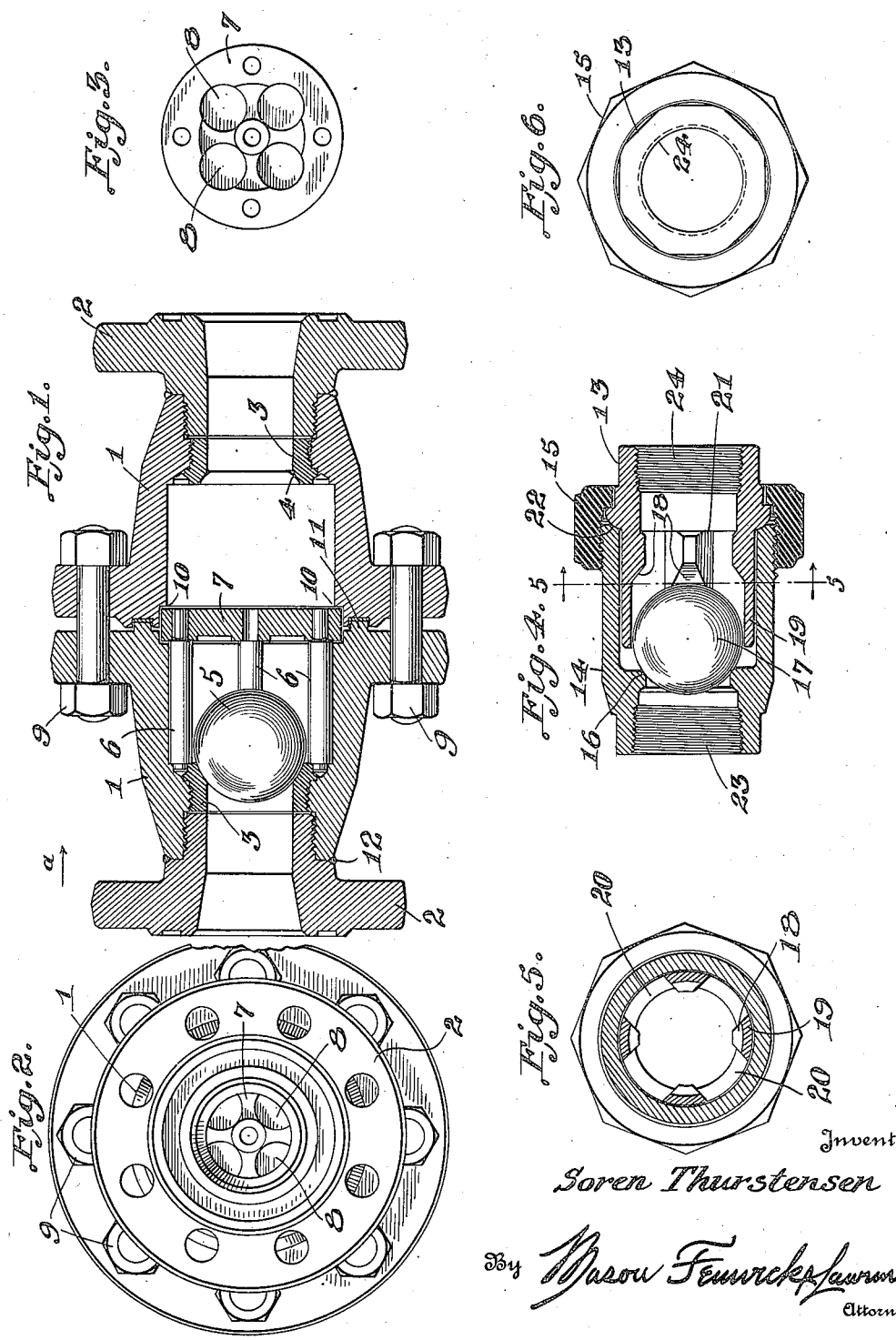
Inventor
Soren Thurstensen
By Mason Fenwick & Lawrence
Attorneys Patented Apr. 29, 1930

1,756,225

UNITED STATES PATENT OFFICE

SOREN THURSTENSEN, OF LOUISVILLE, KENTUCKY, ASSIGNOR TO HENRY VOGT MACHINE CO., OF LOUISVILLE, KENTUCKY

UNION CHECK VALVE

Application filed January 2, 1926. Serial No. 78,963.

This invention relates to improvements in union check valves which may be made preferably of forged steel or any other suitable material, as may be desired.

An object of this invention is to provide a union check valve having ends suitably adapted for either vertical or horizontal positions.

A further object of this invention is to provide a check valve constructed in such a manner that it may be reversed, thereby greatly prolonging the life of the valve in that when one seat becomes worn, the opposite seat within the valve may be utilized.

Other objects of this invention will appear from the following detailed description of the device and as disclosed in the single sheet of drawings which is herewith made a part of this application.

In the drawings, Fig. 1 illustrates a sectional, longitudinal view of the union check valve, showing the check ball element in its relationship thereto.

Fig. 2 represents an end view of Fig. 1 in the direction of "a".

Fig. 3 illustrates an end view of the grid plate in the direction of "a".

Fig. 4 illustrates a sectional longitudinal view of a modified union check valve.

Fig. 5 represents a sectional view of Fig. 4 taken along line 5—5.

Fig. 6 illustrates an end view of Fig. 4.

Numeral 1 designates the body portion of the union check valve, while numeral 2 represents flanged neck portions threaded and screwed into the body portions 1. Numeral 3 designates a seat portion suitably screwed into the body portions 1, thereby providing a ground, bevelled joint as at 4, to receive the check ball 5. Guide pins 6 are suitably supported on a grid plate 7 which is perforated with suitable holes 8. The two body portions 1 of the valve may be connected together by any suitable means such as machine bolts 9. The upper or outlet end of the valve is of the same general construction as the inlet end, therefore the valve may be reversed by merely turning the grid plate 7 and the guides in the opposite direction, and then slipping the ball into its proper place. It is apparent that by constructing the valve in this manner the life of the valve is greatly increased for the reason that when one of the seat ground bevelled joints 4 becomes worn, the valve may be reversed and the other ground seat portion utilized, thereby practically doubling the life of the valve. The two halves of the valve are preferably bolted together in the center where the recess is formed, as at 10, for supporting the grid plate 7, the joint between the flanges being preferably closed by means of a tongue and groove supplied with a gasket 11; however, in this connection it may be stated that a ground joint may, if desired, be used instead of the gasket, or any other suitable means may be employed for this purpose.

In operation, the liquid flows from the inlet end, lifting the ball 5 until it strikes the grid plate 7. The liquid then flows through the holes 8 in the grid plates and discharges through the outlet end of the valve. The flanged portions 2 and the body portions 1 of the union check valve may be electrically welded or otherwise, as may be desired.

In the modified form of union check valve as disclosed in Fig. 5, numerals 13 and 14 designate the body portions of the valve, the portion 14 being the inlet of the valve and the portion 13 being a check guide or discharge end supplied with ports for the flow of liquids. Numeral 15 designates a union nut made of any suitable material and adapted to lock the body portions 13 and 14 firmly together. The body portion 14 is preferably cylindrical and provided with a bevelled ground seat 16, adapted to make a proper joint with the check ball 17. The check guide portion 13 is preferably cylindrical in form and adapted to fit inside of the body portion 14, it being bored out to allow the check ball 17 to freely raise or move for a required distance until the ball is stopped by an inclined face 18 on the guides 19. The check guide 13 is supplied with a multiplicity of ports as disclosed at 20, cut into the check guide 13 from the inner end of the guide 13 to a point as at 21, the object of these ports being to provide a means whereby when the ball rises, it is guided by the prongs 19 until stopped by the inclined face 18. Preferably there are four ports 20, between the ball 17 and line 21. These ports will function to supply area sufficient for discharging the liquid freely into the discharge end of the valve. When the flow of liquid stops the ball will obviously fall or roll back onto seat 16, thus checking a backward flow of liquid. The joint 22 between the body portion 14 and the check guide 13 may be formed as a ground ball joint, or any other suitable joint, either ground or a gasket. The valve at the inlet and discharge ends is provided with standard pipe threads as at 23 and 24, and the outside of the ends are milled either hexagon or octagon to facilitate screwing the valve onto the pipe line.

What I claim is:—

1. A check valve for liquids having an inlet and outlet, a body portion, a check element within the body portion in slidable relationship thereto, and suitable seat portions for receiving the check element, the inlet and outlet ends of the valve being of the same construction, a grid plate having guide pins located between the inlet and outlet portions, thereby allowing the valve to be reversed by turning the grid plate with the guide pins about and changing the location of the checking element within the body portion.

2. A check valve comprising a pair of sections, means for detachably securing said sections to each other with their ends in contact and in alinement with each other, similar valve seats detachably fixed in the outer ends of said sections, a valve slidable between said seats and adapted to fit either seat, and means secured between said sections to prevent seating contact of said valve with one of said seats.

3. A check valve comprising a pair of similar tubular conduits detachably secured end to end to each other, similar valve seats in the free ends of said sections, a stop secured between the contacting ends of said conduits and having guides extending therefrom to one of said seats, and a valve slidable on said guides between said seat and said stop.

4. A check valve comprising a pair of similar tubular conduits detachably secured end to end to each other, similar valve seats on the free end of said sections, a guide cage having an end clamped between the inner ends of said conduits and having guides extending therefrom to one of said seats, and a ball valve adapted to fit either seat and slidable on said guide between said end and said seat, said cage being reversible to fit either of said conduits.

5. In a check valve comprising a tubular body having identical detachable valve seats at each end thereof, a ball valve slidable in said body between the seats thereof and adapted to close either seat, a flat grid centrally secured in said body to prevent closing contact between said valve and one of said seats, and means carried by said grid to guide the valve toward and from its seat 6. A check valve having a tubular body comprising internally identical tubular sections, each section having a flange at one of its ends, and having a annular recess at the flange end thereof, a perforated disk seated in said recesses, means for clamping said flanges to each other with the grid clamped between shoulders of said recesses, identical valve seats screwthreaded with the free ends of said sections, guides extending from said grid to one of said seats and adapted to be reversed to extend from said grid to the other seat, and a valve slidable on said guides between said seat and said grid.

7. A check valve for liquids having an inlet and an outlet, a body portion, a check element slidable in said body portion, renewable seat portions for receiving the check element, the body portion comprising a multiplicity of sections suitably secured together and the inlet and outlet ends thereof being of the same construction, and a grid plate secured in said portion between said sections and the inlet and outlet ends thereof and having openings through which liquid is adapted to flow.

SOREN THURSTENSEN.